United States Patent [19]

Matsubara et al.

[11] Patent Number: 5,155,618
[45] Date of Patent: Oct. 13, 1992

[54] LIGHT SIGNAL GENERATING DEVICE USING ELECTRO-OPTICAL LIGHT SHUTTER ARRAY

[75] Inventors: Ken Matsubara, Takatsuki; Hirohisa Kitano; Koji Wakamiya, both of Osaka, all of Japan

[73] Assignee: Minolta Camera Kabushiki Kaisha, Osaka, Japan

[21] Appl. No.: 801,423

[22] Filed: Dec. 2, 1991

[30] Foreign Application Priority Data

Jun. 28, 1991 [JP] Japan ................ 3-158490

[51] Int. Cl.⁵ .................. G02F 1/03; G02F 1/01; G09G 1/26; G01D 15/14
[52] U.S. Cl. .................. 359/245; 359/254; 359/276; 340/783; 340/795; 346/160
[58] Field of Search ............ 359/245, 246, 254, 255, 359/276; 340/784-787, 795; 346/160

[56] References Cited

U.S. PATENT DOCUMENTS

| 4,596,992 | 6/1986 | Hornbeck ............... 346/76 PH |
| 4,840,462 | 6/1989 | Hartmann ............... 340/784 |
| 4,902,111 | 2/1990 | Matsubara et al. ........ 350/393 |
| 4,932,761 | 6/1990 | Shingaki et al. ......... 350/387 |
| 5,024,511 | 6/1991 | Matsubara et al. ........ 359/245 |

FOREIGN PATENT DOCUMENTS

| 0074034 | 4/1988 | Japan ................. 359/245 |
| 63-189826 | 8/1988 | Japan . |
| 1534027 | 11/1978 | United Kingdom . |

Primary Examiner—Eugene R. LaRoche
Assistant Examiner—Evelyn A. Lester
Attorney, Agent, or Firm—Burns, Doane, Swecker & Mathis

[57] ABSTRACT

A light signal generating device having a plurality of electro-optical light shutter elements which are turned on and off individually in accordance with image data. The light shutter elements are connected to individual electrodes each, and also connected to a common electrode. The common electrode and a power source for supplying a voltage to the individual electrodes are connected with a grounding line. Discharge lines are disposed between the common electrode and the grounding line, and switching elements are disposed on the discharge lines so as to prevent discharge currents, which are drawn from the light shutter elements at falls of the driving voltage, from flowing into the grounding line.

11 Claims, 6 Drawing Sheets

LIGHT SIGNAL GENERATING DEVICE USING ELECTRO-OPTICAL LIGHT SHUTTER ARRAY

BACKGROUND OF THE INVENTION

1. Field of the Invention

The present invention relates to a light signal generating device, and more particularly to a light signal generating device using an electro-optical light shutter array.

2. Description of Related Art

Conventionally, a light signal generating device using a light shutter array which is made of a material having an electro-optical effect, e.g., PLZT is known. The PLZT light shutter array has a plurality of light shutter elements arranged in at least one line. The light signal generating device includes a polarizer and an analyzer which are disposed before and behind the light shutter array respectively. Each of the light shutter elements is driven based on image data to modulate light. Since the PLZT light shutter array can be driven very speedily by application of a driving signal, it may be used in a high-speed printer.

However, in the PLZT light shutter array, since the light shutter elements act as capacitors, spike noise occurs on a grounding line when the driving signal rises and falls. This spike noise causes misoperation of a control circuit, specifically, a shift register to which image data are transmitted. Accordingly, it is required to avoid transmitting image data to the shift register when the driving signal rises and falls. When a frequency of the driving signal becomes higher, the data transmission time is limited. The frequency Of the driving signal therefore can not be higher, and high-speed recording can not be achieved.

SUMMARY OF THE INVENTION

An object of the present invention is to provide a light signal generating device wherein limit to image data transmission time is loosened by preventing occurrence of spike noise at falls of a driving signal which controls light shutter elements.

In order to attain the object, a light signal generating device according to the present invention comprises prevention means for preventing a discharge current from flowing from a common electrode of light shutter elements to a grounding line.

BRIEF DESCRIPTION OF THE DRAWINGS

This and other objects and features of the present invention will be apparent from the following description of the preferred embodiments in reference with the accompanying drawings, in which.

DETAILED DESCRIPTION OF THE PREFERRED EMBODIMENTS

An exemplary light signal generating device according to the present invention is hereinafter described in reference with the accompanying drawings.

Figure 1:
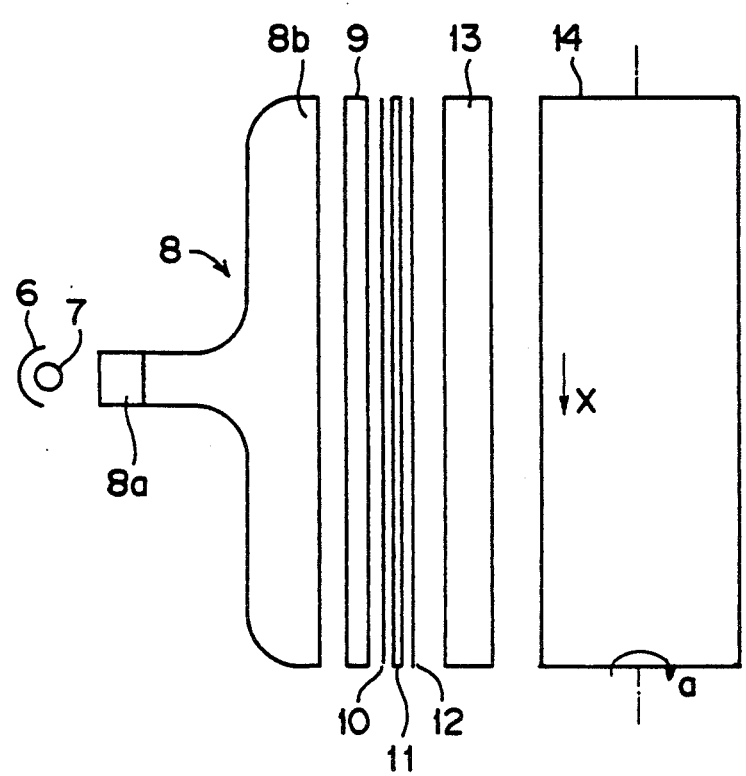
FIG. 1 is a schematic view of a light signal generating device.

FIG. 1 shows the composition of the light signal generating device schematically. The light signal generating device is adopted to be used as a recording head for recording an image on a photosensitive drum 14, and consists mainly of a light source 7 provided with a reflection mirror 6, an optical fiber array 8, a rod lens 9, a light shutter array 11 and a projection lens array 13.

The optical fiber array 8 comprises many optical fibers, and the optical fibers are bunched up at one end, such that a light entrance portion 8a, which faces the light source 7, is formed. The optical fibers are arranged in some arrays parallel with a main-scanning direction (indicated by arrow X) at the other end, such that a light exit portion 8b is formed. The light shutter array 11 is formed by arranging shutter elements made of PLZT in lines on a glass board. The polarizer 10 and the analyzer 12 are disposed before and behind the light shutter array 11. The lens array 13 comprises many convergent rod lenses, and the lens array 13 is to converge light on the photosensitive drum 14.

In the structure above, light radiated from the light source 7 is collected by the reflection mirror 6, and the reflected light from the mirror 6 enters the optical fiber array 8 through the light entrance portion 8a and exits therefrom through the light exit portion 8b along a line parallel with the main-scanning direction. This light transmits the rod lens array 9 and the polarizer 10, and irradiates the light shutter array 11. The shutter elements are turned on and off individually in accordance with image data. The shutter elements rotate a polarization surface of the light coming from the polarizer 10, when they are impressed with voltages. The light transmits energized shutter elements and further transmits the analyzer 12. Then, the light is converged on the photosensitive drum 14 through the lens array 13. The photosensitive drum 14 is rotated in a direction of arrow a at a constant speed. Thus an electrostatic latent image corresponding to the image data is formed on the photosensitive drum 14 by energizing and deenergizing the shutter elements individually.

Figure 2:
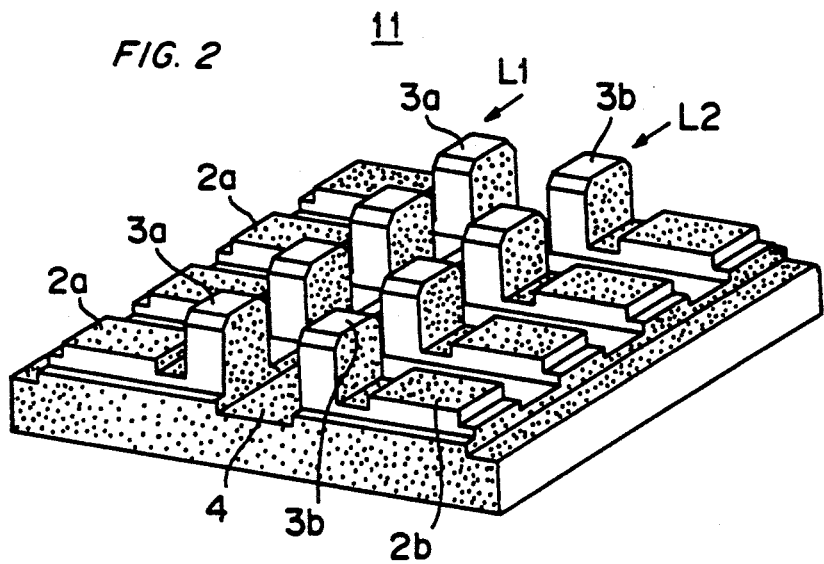
FIG. 2 is a perspective view of a light shutter array.

Now referring to FIG. 2, the structure of the light shutter array 11 is described.

The light shutter array 11 is formed by arranging many shutter elements in lines, which shutter elements are made of PLZT having electrooptic effect, and each of the shutter elements acts as a shutter window of a single picture element. Shutter elements in a line L1 are referenced by 3a, and shutter elements in a next line L2 are referenced by 3b. The lines L1 and L2 extend in the main-scanning direction X. The shutter elements 3a and 3b have individual electrodes 2a and 2b, and a common electrode 4 is disposed between the line L1 of the shutter elements 3a and the line L2 of the shutter elements 3b. The line L1 is located upstream of the line L2 in respect to the direction of rotation of the photosensitive drum 14. First the shutter elements 3a in the line L1 are turned on and off individually, and with a time lag P/V (P: line pitch, V: circumferential speed of the photosensitive drum 14), the shutter elements 3b in the line L2 are turned on and off individually. Scanning of one line, that is, image recording of one line on the photosensitive drum 14 is performed in this manner.

Figure 3:
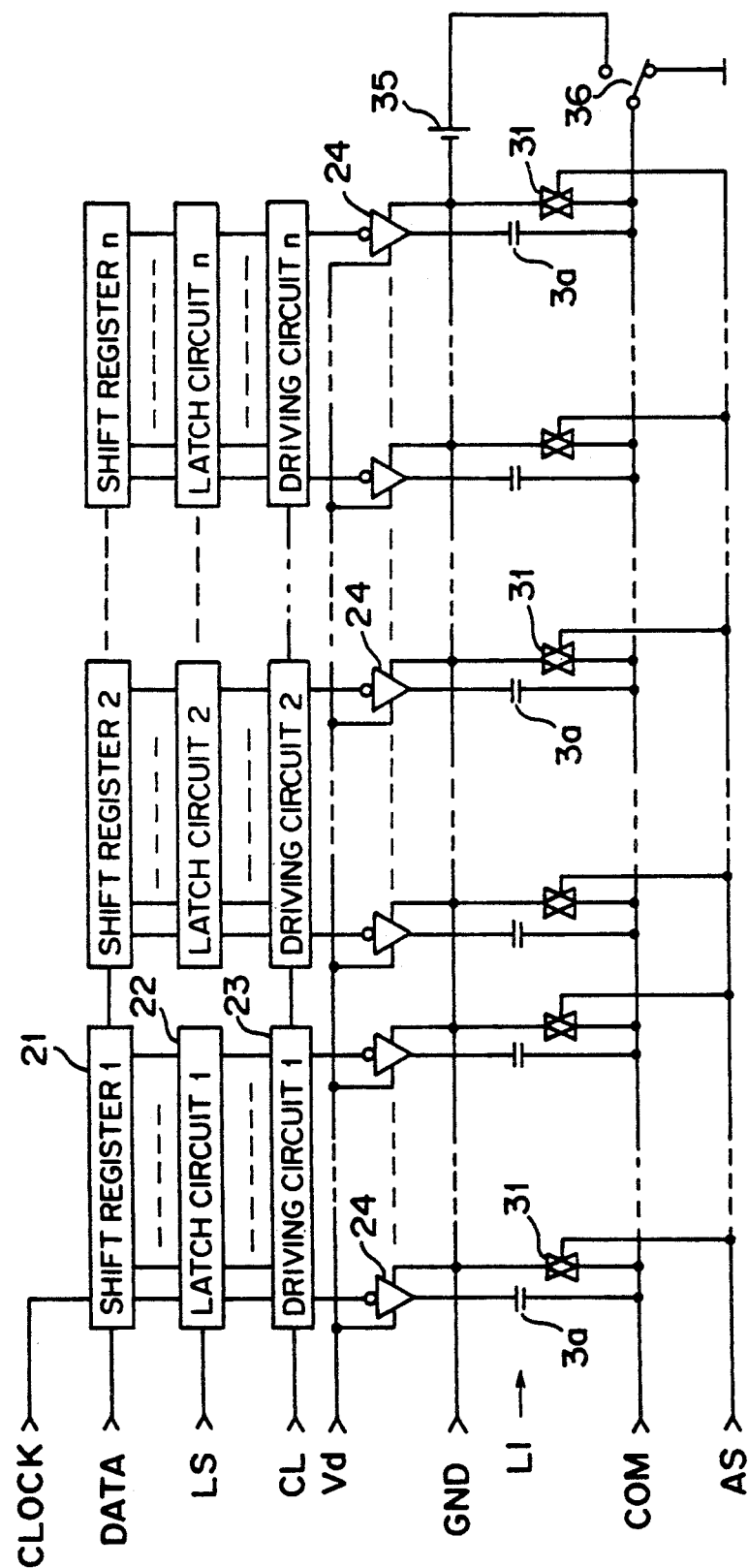
FIG. 3 is a block diagram of a control circuitry of light shutter elements.
Figure 4:
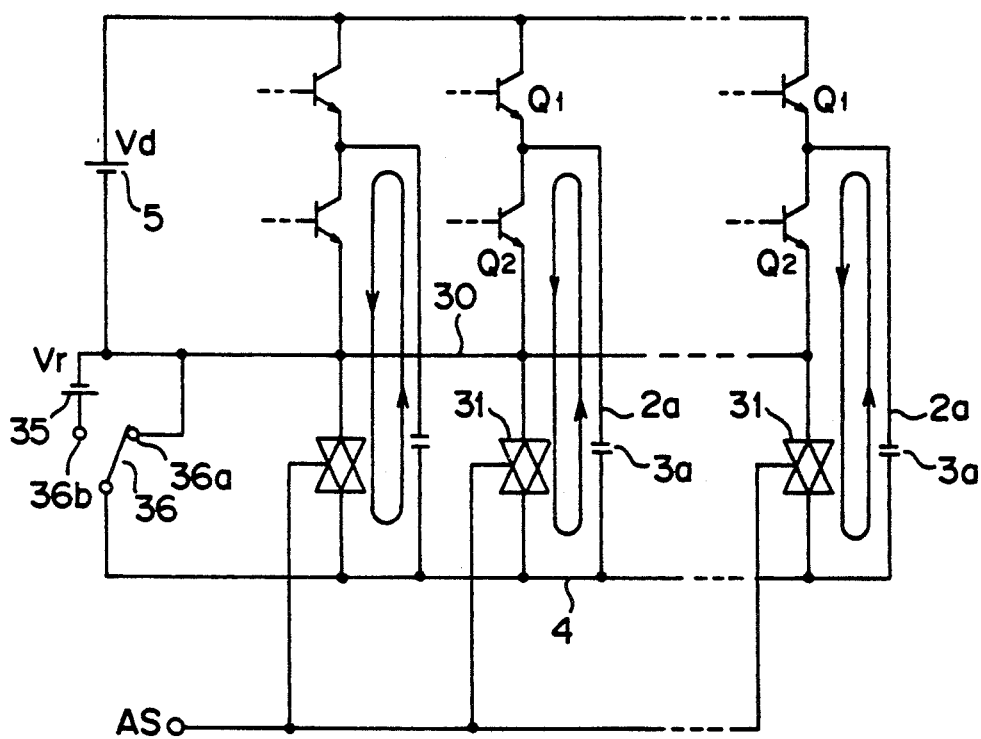
FIG. 4 is a block diagram of an essential part of the control circuitry shown in FIG. 3.

FIGS. 3 and 4 show a control circuitry of the line L1 of the shutter elements 3a. Further, the shutter elements 3b in the line L2 are controlled in a similar control circuitry.

The control circuitry comprises shift registers 21, latch circuits 22, driving circuits 23 and drivers 24. The drivers 24 each have two driving transistors Q1 and Q2 which are connected to the corresponding shutter element 3a. A power source 5 outputs a voltage Vd toward all the drivers 24. Each of the individual electrodes 2a which are coupled with the shutter elements 3a is connected to an emitter of the corresponding transistor Q1 and a collector of the corresponding transistor Q2. An emitter of the transistor Q2 is connected to a grounding line 30. Between the grounding line 30 and the common electrode 4, analog switches 31 of a C-MOS structure are inserted such that the switches 31 are coupled with the shutter elements 3a. The analog switches 31 are turned on and off individually in response to a driving signal. A turned-on analog switch 31 draws a current from the grounding line 30 to the common electrode 4, and the current circulates in a closed loop formed by the analog switch 31, and the corresponding shutter element 3a and transistor Q2.

Further, a bias voltage source 35 which outputs a voltage Vr having polarity opposite to the voltage outputted from the power source 5, and a switch 36 are inserted between the grounding line 30 and the common electrode 4.

The operation of the control circuitry is hereinafter described referring to the timing chart of FIG. 5.

Figure 5:
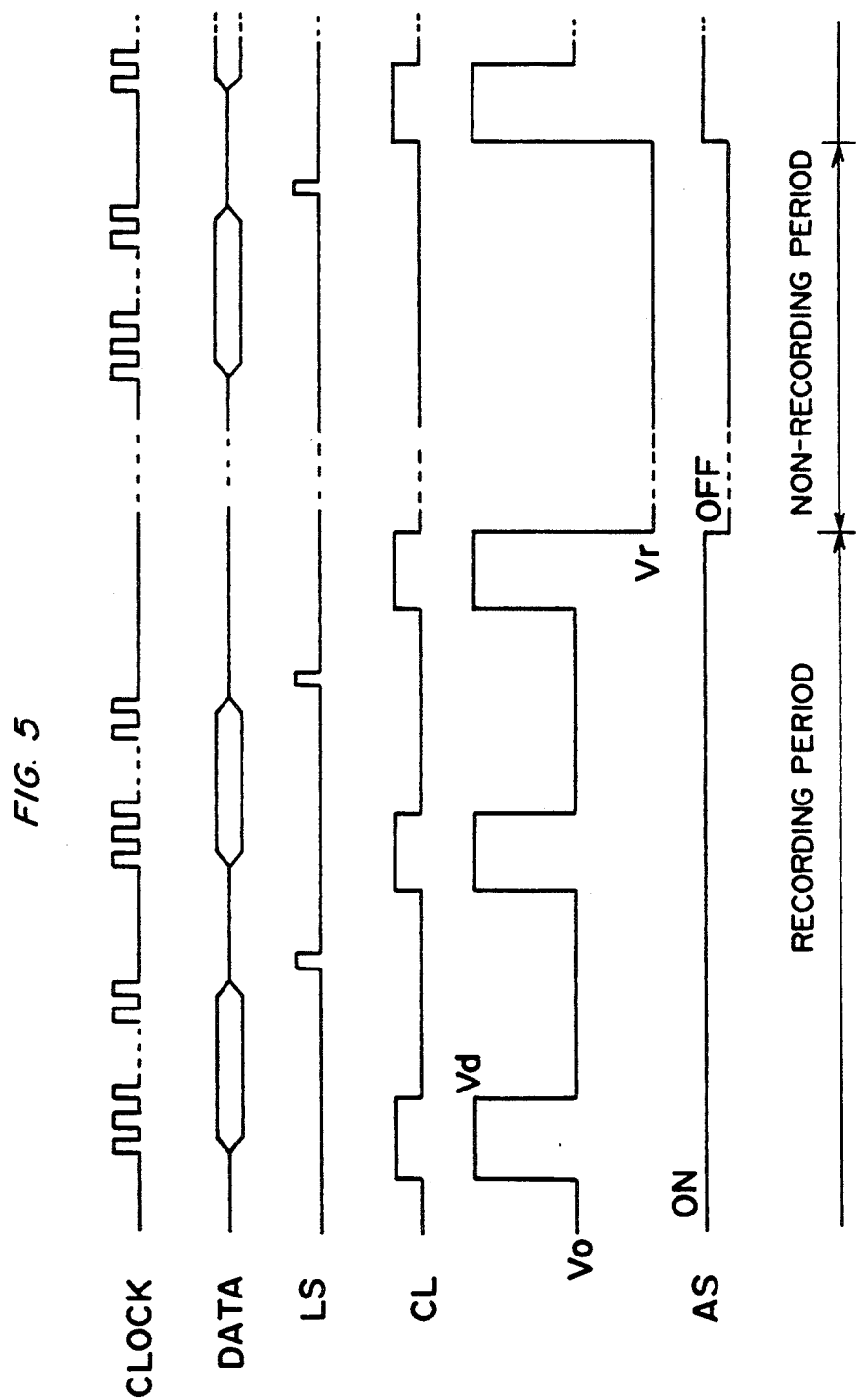
FIG. 5 is a time chart showing the operation of the control circuitry.

A "recording period", which is shown in FIG. 5, in the bottom, means a period when an image on one page is recorded. First, image data is transmitted to the shift registers 21 in synchronization with a clock signal. When image data for one scanning line are all collected in the shift registers 21, a latch strobing signal LS is generated, and in response to the signal LS, the image data are latched in the latch circuits 22. Then, a driving signal CL is turned on. While the signal CL is on, the power source 5 continues outputting the voltage Vd toward the shutter elements 3a. This operation is performed for every scanning line.

The switch 36 is kept connected to a contact point 36a during the recording period so as to connect the common electrode 4 with the grounding line 30. During a non-recording period (an interval between pages), the switch 36 is kept connected to a contact point 36b leading to the bias voltage source 35, and the shutter elements 3a are impressed with the bias voltage Vr. If an electric field of a specified direction continues covering the shutter elements 3a while line scanning on the photosensitive drum 14 is repeated, the shutter elements 3a will be polarized, and the quantity of light the shutter elements 3a can transmit will change (decrease). In order to prevent the polarization of the shutter elements 3a, the bias voltage Vr is impressed thereon during the non-recording period.

Figure 6A:
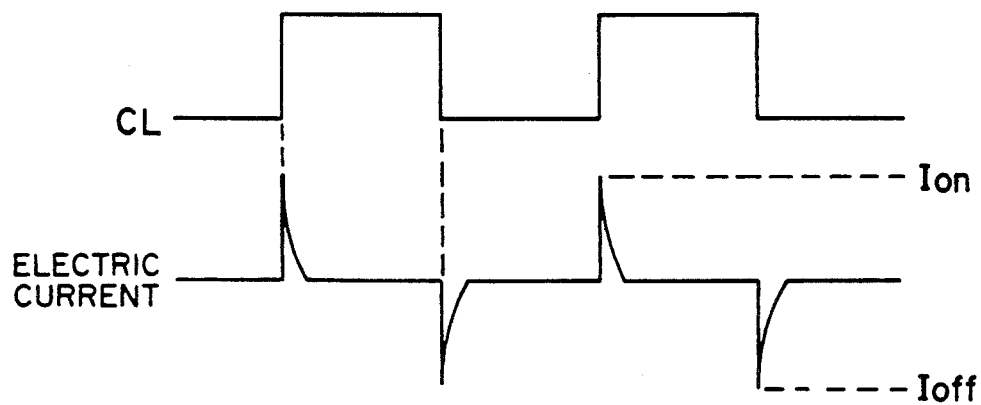
FIGS. 6a and 6b are charts showing a current which flows in a grounding line when a driving signal is turned on and off.
Figure 6B:
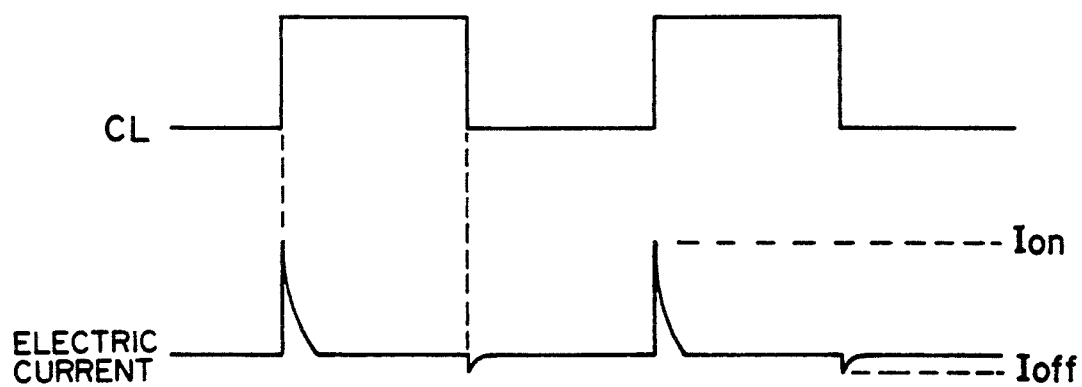

When outputting and stopping the driving voltage Vd, the shutter elements 3a function as capacitors. At rises and falls of the voltage Vd, charging currents Ion and discharge currents Ioff flow in the shutter elements 3a, which causes spike noise as shown in FIG. 6a. Then, radiation of the spike noise may lead to misoperation of a logic section of the control circuitry, and image data input into the shift registers 21 may not be performed accurately. In this embodiment, however, the analog switches 31 are kept on during the recording period, and the discharge currents Ioff which occur at falls of the driving voltage Vd circulate in the respective closed loops formed by the respective shutter elements 3a, transistors Q2 and analog switches 31. Therefore the grounding line 30 does not act as common impedance, and the discharge currents Ioff are extremely small as shown in FIG. 6b.

In this embodiment, since the discharge currents Ioff are small as described above, image data can be transmitted to the shift registers 21 even when the driving voltage Vd falls. In other words, the image data transmission should be performed, only avoiding spike noise caused by the charging currents Ion which occur at rises of the driving voltage Vd. Thus limit to the data transmission time can be loosened, that is, the data transmission time becomes longer. Thereby the light shutter array 11 of the above structure can comply with a high driving frequency for high-speed recording. Further, the analog switches 31 are kept off during the non-recording period, which allows the shutter elements 3a to be impressed with the bias voltage Vr with polarity opposite to the driving voltage Vd by the bias voltage source 35.

Figure 7:
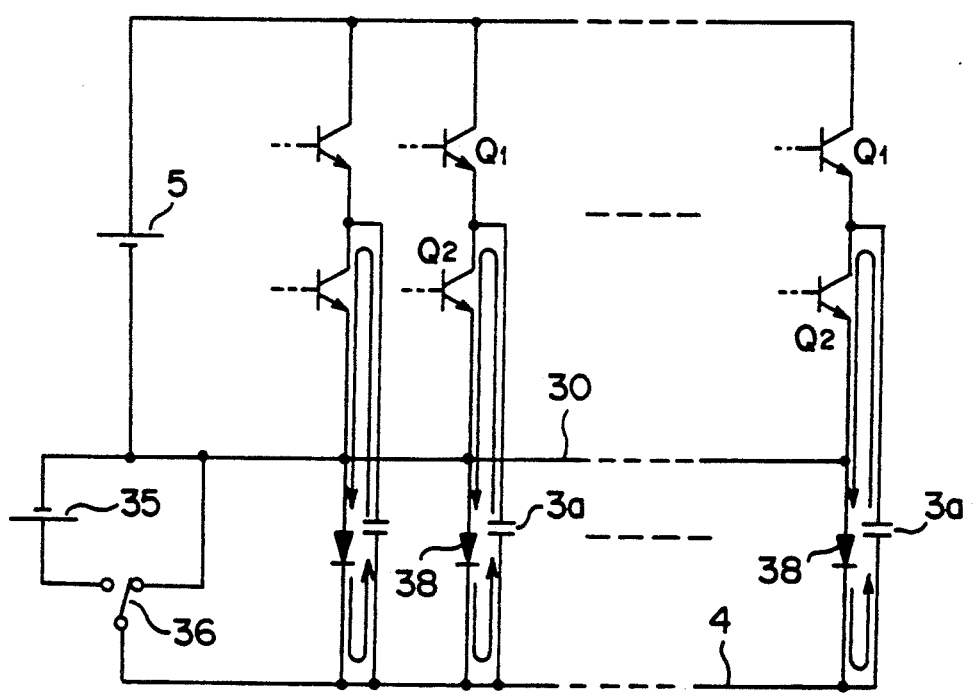
FIG. 7 is a block diagram of a modified control circuit of the light shutter elements.

FIG. 7 shows a modified control circuit which can replace the circuit shown in FIG. 4. In FIGS. 4 and 7, the same components are referenced by the same numbers and marks. In the control circuit of FIG. 7, diodes 38 are used as switching elements, and their anodes and cathodes are connected to the grounding line 30 and the common electrode 4 respectively. Discharge currents which occur at falls of the driving voltage Vd circulate in closed loops formed by the respective shutter elements 3a, transistors Q2 and diodes 38. This arrangement inhibits occurrence of spike noise.

Also, the switch 36 is connected to the contact point 36b leading to the bias voltage source 35 during the non-recording period, and the shutter elements 3a are impressed with a bias voltage with polarity opposite to the driving voltage.

Although the present invention has been described in connection with the preferred embodiments above, it is to be noted that various changes and modifications are apparent to a person skilled in the art. Such changes and modifications are to be understood as being within the scope of the present invention defined by the appended claims.

What is claimed is:

1. A light signal generating device comprising:
a plurality of electro-optical light shutter elements;
a plurality of individual electrodes arranged on the light shutter elements respectively;
a common electrode arranged on the light shutter elements, said common electrode being connected to a grounding line;
drive means for selectively applying a driving voltage to the individual electrodes, said drive means being connected to the grounding line; and
prevention means for preventing a discharge current from flowing from the common electrode to the grounding line.

2. A light signal generating device as claimed in claim 1, wherein said drive means includes a first switching element disposed between each individual electrode and an electric source, and a second switching element disposed between each individual electrode and said common electrode.

3. A light signal generating device as claimed in claim 1, wherein said prevention means includes a plurality of discharge lines which connect the common electrode with the grounding line, said discharge lines being disposed corresponding to the individual electrodes respectively.

4. A light signal generating device as claimed in claim 3, wherein said prevention means includes a plurality of switching elements disposed on the discharge lines respectively.

5. A light signal generating device as claimed in claim 3, wherein said prevention means includes a plurality of diodes disposed on the discharge lines respectively.

6. A light signal generating device comprising:

a plurality of electro-optical light shutter elements;
a plurality of individual electrodes arranged on the light shutter elements respectively;
a common electrode arranged on the light shutter elements;
a drive circuit for selectively applying a driving voltage to the individual electrodes, said drive circuit having a first terminal connected to a grounding line and a plurality of second terminals connected to the individual electrodes respectively; and
prevention means for preventing a discharge current from flowing to the first terminal of the drive circuit, said prevention means including a plurality of discharge lines which connect the common electrode with the grounding line, said discharge lines being disposed corresponding to the individual electrodes respectively.

7. A light signal generating device as claimed in claim 6, wherein said prevention means includes a plurality of switching elements disposed on the discharge lines respectively.

8. A light signal generating device as claimed in claim 6, wherein said prevention means includes a plurality of diodes disposed on the discharge lines respectively.

9. A light signal generating device comprising:

a plurality of electro-optical light shutter elements;
a plurality of individual electrodes arranged on the light shutter elements respectively;
a common electrode arranged on the light shutter elements, said common electrode being connected to a grounding line;
an electric source;
a plurality of first switching elements disposed between the electric source and the respective individual electrodes;
a plurality of second switching elements disposed between the grounding line and the respective individual electrodes; and
a plurality of discharge lines which connect the common electrode with the grounding line, said discharge lines being disposed corresponding to the individual electrodes respectively.

10. A light signal generating device as claimed in claim 9, further comprising a plurality of third switching elements disposed on the discharge lines respectively.

11. A light signal generating device as claimed in claim 9, further comprising a plurality of diodes disposed on the discharge lines respectively.

* * * * *